United States Patent Office 3,631,024
Patented Dec. 28, 1971

3,631,024
1,3-DIOXA-2-BORINANE COMPOUNDS AND PROCESS FOR THEIR PRODUCTION
Hampton D. Smith, Jr., Orange, Calif., assignor to United States Borax & Chemical Corporation, Los Angeles, Calif.
No Drawing. Continuation-in-part of abandoned application Ser. No. 710,764, Mar. 6, 1968. This application Mar. 4, 1970, Ser. No. 16,578
Int. Cl. C07d 107/02
U.S. Cl. 260—239 E                    9 Claims

ABSTRACT OF THE DISCLOSURE 2-(N-aziridinyl)-1,3-dioxa-2-borinane compounds having alkyl substituents on the dioxaborinane ring are provided. The compounds are readily prepared by reaction of aziridine with the corresponding alkyl-substituted 1,3-dioxa-2-borinane. They are useful as curing agents for epoxy resins.

---

This application is a continuation-in-part of my co-pending application, Ser. No. 710,764 filed Mar. 6, 1968 and now abandoned.

This invention relates to novel 2-(N-aziridinyl)-1,3-dioxa-2-borinane compounds and a novel method for preparing them.

The present invention provides by means of a novel process, a new class of compounds, the aziridinyl-dioxaborinanes of the formula

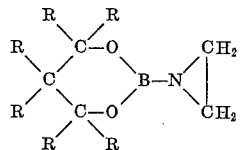

wherein each R is selected from the group consisting of hydrogen and alkyl of from 1 to about 4 carbon atoms, at least one of said R's being alkyl. Thus, each R in the above formula can represent the same or different alkyls or hydrogen so long as at least one carbon atom has at least one alkyl substituent. Examples of suitable alkyl groups represented by R are methyl, ethyl, propyl, isopropyl, n-butyl, and sec-butyl. Preferably, one to about three R's in the above formula are alkyl groups.

The compounds are colorless, crystalline solids or high-boiling liquids which can be distilled under reduced pressure. They are soluble in the conventional hydrocarbon and ether solvents. They are readily prepared by reaction of aziridine with the corresponding 1,3-dioxa-2-borinane as illustrated by the following equation:

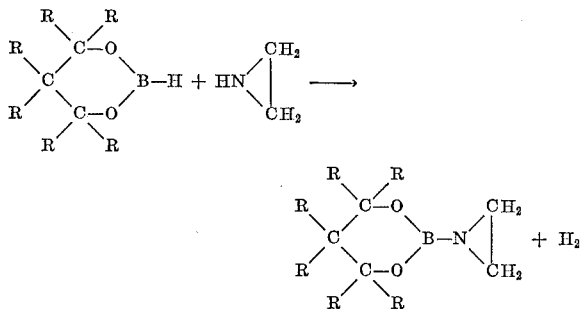

in which R has the significance previously assigned.

Preferably, substantially equimolar amounts of the reactants are used to obtain best yields of the desired product. The reaction preferably takes place at low temperatures, such as in the range of from about 0° to about 70° C. and an organic solvent such as cyclohexane or hexane is employed as a liquid reaction medium so as to control the reaction temperature and also facilitate handling of the reactants. The 2-aziridinyldioxaborinane compound is isolated and purified by conventional procedures such as distillation under reduced pressure.

The intermediate 1,3-dioxa-2-borinanes can be prepared by reaction of the corresponding 2-halo-1 3-dioxa-2-borinane with sodium borohydride such as described in Woods et al., U.S. Pat. 3,383,401 issued May 15, 1968.

The following example illustrates the preparation of a representative compound of this invention, but it is to be understood that the invention is not limited to the specific example given.

EXAMPLE

A hexane solution of 8.6 grams (0.2 mole) of aziridine in 20 ml. of hexane was added dropwise to 25.4 grams (0.2 mole) of 4,4,6-trimethyl-1,3-dioxa-2-borinate dissolved in 100 ml. of hexane. The solution was maintained at 5° C. and under constant nitrogen purge. Hydrogen evolution began immediately and the reaction was considered complete after the addition of all the aziridine. The hexane was removed by distillation under reduced pressure. The residue was distilled and the desired products obtained at 76° C./0.24 mm. Hg in about an 80% yield. Upon standing, the distillate crystallized to give a white solid melting at 73°–76° C. After recrystallization from methanol, the compound melted at 82°–83° C.

Analysis.—Calcd. for $C_8H_{16}BNO_2$ (percent): C, 56.85; H, 9.54; B, 6.40; N, 8.30. Found (percent): C, 56.69; H, 9.89; B 6.49; N, 8.19; (mol. wt., 493) (calcd. for trimer: 507).

As indicated by its molecular weight, the compound exists in trimeric form. The trimer can be illustrated by the following structural formula

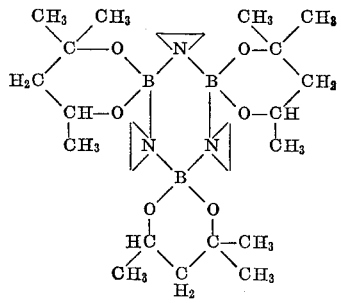

When aziridine is reacted with 2-chloro-4,4,6-trimethyl-1,3-dioxa-2-borinane according to the general procedure described in U.S. Pat. 2,886,575, only intractable polymeric tars are obtained from which no 2-aziridinyl-dioxaborinane can be isolated.

The following are among the many other compounds embraced by the present invention and may be prepared according to the procedure described in the example above.

2-(N-aziridinyl)-4-methyl-1,3-dioxa-2-borinane
2-(N-aziridinyl)-5,5-dimethyl-1,3-dioxa-2-borinane
2-(N-aziridinyl)-5-butyl-5-ethyl-1,3-dioxa-2-borinane
2-(N-aziridinyl)-5-methyl-5-ethyl-1,3-dioxa-2-borinane The compounds of this invention are useful as curing agents for epoxy resins. For example, a mixture of 2-(N-aziridinyl)-4,4,6-trimethyl - 1,3 - dioxa - 2 - borinane (6.1 grams) and 100 grams of CIBA 6020, a bisphenol-A-epichlorohydrin type epoxy resin, was warmed in order to obtain complete solution and then cured at 120° C. for 20 hours. A hard, amber-colored resin was obtained having a Shore D hardness of 45.

What is claimed is:
1. A compound of the formula

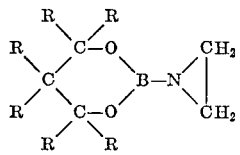

wherein each R is selected from the group consisting of hydrogen and alkyl of from 1 to 4 carbon atoms, at least one of said R's being alkyl, said compound being in trimeric form.

2. Trimeric 2 - (N - aziridinyl)-4,4,6-trimethyl-1,3-dioxa-2-borinane.

3. A compound in accordance with claim 1 in which 1 to 3 R's are alkyl of 1 to 4 carbon atoms.

4. The process for preparing a 2-(N-aziridinyl)-1,3-dioxa-2-borinane compound of the formula

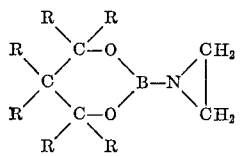

which comprises reacting aziridine with a compound of the formula

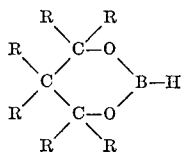

wherein each R is selected from the group consisting of hydrogen and alkyl of from 1 to 4 carbon atoms, at least one of said R's being alkyl, said 2-(N-aziridinyl)-1,3-dioxa-2-borinane compound being in trimeric form.

5. The process according to claim 4 in which substantially equimolar amounts of reactants are employed.

6. The process according to claim 4 in which the reaction takes place at a temperature of about 0° to about 70° C.

7. The process for preparing trimeric 2 - (N - aziridinyl)-4,4,6 - trimethyl-1,3-dioxa-2-borinane which comprises reacting aziridine with 4,4,6-trimethyl-1,3-dioxa-2-borinane.

8. The process according to claim 7 in which substantially equimolar amounts of said reactants are employed.

9. The process according to claim 7 in which the reaction takes place at a temperature of about 0° to about 70° C.

References Cited
UNITED STATES PATENTS

| | | | |
|---|---|---|---|
| 2,886,575 | 5/1959 | Conklin et al. | 260—462 |
| 3,393,184 | 7/1968 | Hoffman | 260—239 |

OTHER REFERENCES

Dow, Ethyleneimine (Dow Chemical Company, 1965), pages 5, 8–10, and 35–36.

ALTON D. ROLLINS, Primary Examiner

U.S. Cl. X.R.

260—2 EP, 2 N, 47 EQ, 47 EN

UNITED STATES PATENT OFFICE
CERTIFICATE OF CORRECTION

Patent No. 3,631,024          Dated December 28, 1971

Inventor(s) HAMPTON D. SMITH, JR.

It is certified that error appears in the above-identified patent and that said Letters Patent are hereby corrected as shown below:

In Column 2, line 7, that portion of the compound appearing as "2-halo-1 3-dioxa-2-" should read --2-halo-1,3-dioxa-2- --;

line 18, the compound appearing as "4,4,6-trimethyl-1,3-dioxa-2-borinate" should read --4,4,6-trimethyl-1,3-dioxa-2-borinane--;

line 20, after the word "under" should appear the word --a--;

line 25, the word "products" should read --product--.

Signed and sealed this 13th day of June 1972.

(SEAL)
Attest:

EDWARD M. FLETCHER, JR.
Attesting Officer

ROBERT GOTTSCHALK
Commissioner of Patents